United States Patent [19]

Newton

[11] Patent Number: 5,253,470
[45] Date of Patent: Oct. 19, 1993

[54] GAS TURBINE ENGINE STARTING

[75] Inventor: Arnold C. Newton, Derby, England

[73] Assignee: Rolls-Royce PLC, London, England

[21] Appl. No.: 916,669

[22] Filed: Jul. 22, 1992

[30] Foreign Application Priority Data

Oct. 16, 1991 [GB] United Kingdom ............ 9121994

[51] Int. Cl.$^5$ .................................. F02C 7/06
[52] U.S. Cl. .................. 60/39.08; 60/39.141;
60/39.142; 184/6.3
[58] Field of Search .......... 60/39.141, 39.142, 730,
60/736, 39.83, 39.08; 184/6.3, 6.11

[56] References Cited

U.S. PATENT DOCUMENTS 3,451,214  10/1992  Bradley ................. 60/39.141
4,354,345  10/1982  Dreisbach ............... 60/39.08
4,779,412  10/1988  Deiner .................. 60/39.02
5,121,598   6/1992  Butler .................. 60/736

FOREIGN PATENT DOCUMENTS 701121  12/1953  United Kingdom .
763449  12/1956  United Kingdom .
912762  12/1962  United Kingdom .
2144804  3/1985  United Kingdom .

Primary Examiner—Richard A. Bertsch
Assistant Examiner—W. J. Wicker
Attorney, Agent, or Firm—Oliff & Berridge

[57] ABSTRACT

A ducted fan gas turbine engine (10) is provided with an electric motor starter unit (16). The oil lubrication system of the engine (10) is so arranged that during engine starting, the heat generated by the starter unit (16) is used to heat up the oil in the system. This reduces the viscosity of the oil, thereby facilitating easy engine starting under very cold conditions.

6 Claims, 1 Drawing Sheet

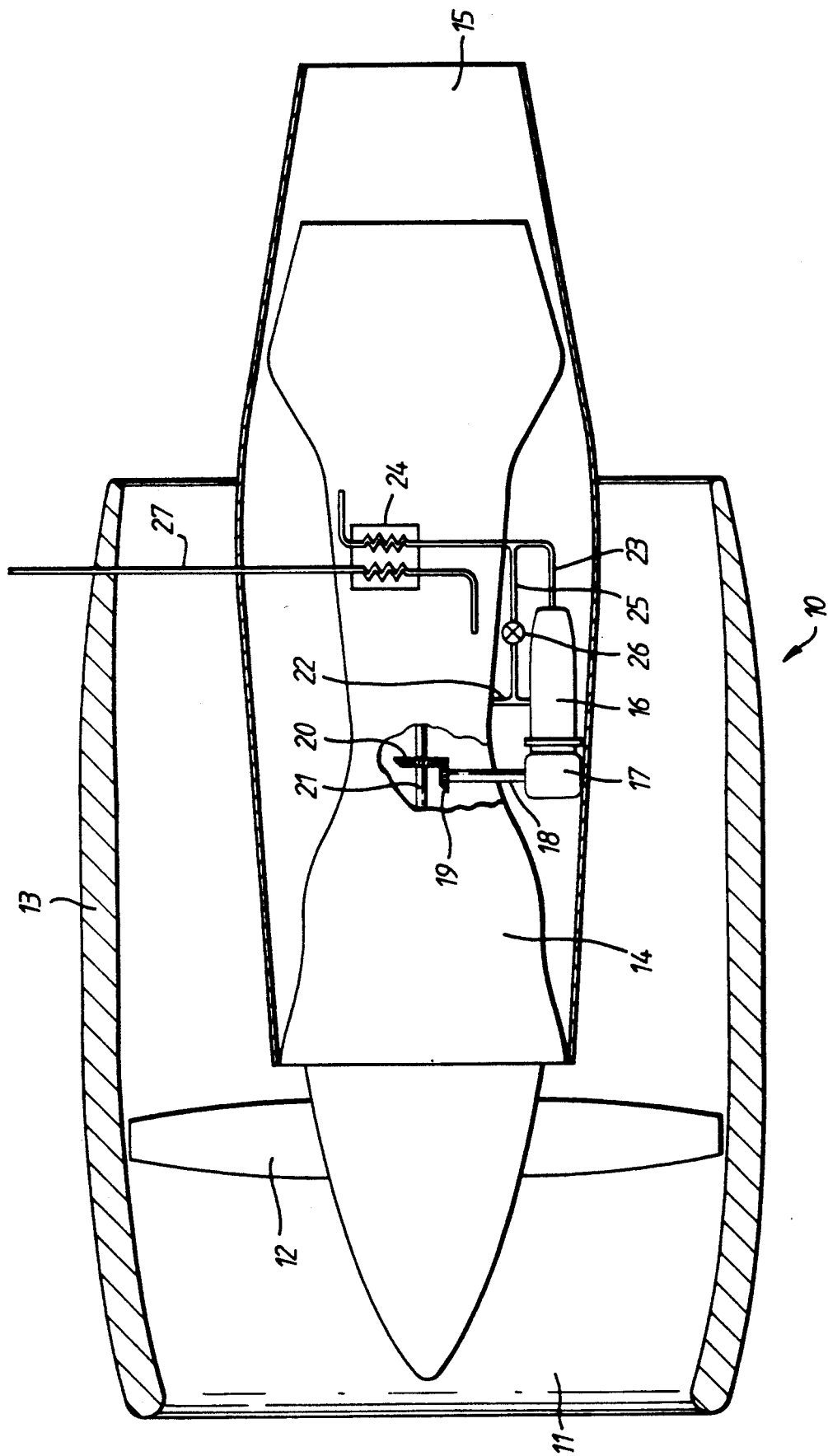

GAS TURBINE ENGINE STARTING

This invention relates to gas turbine engine starting and in particular to gas turbine engine starting in cold weather conditions.

When gas turbine engines are required to operate in very cold weather conditions, they can sometimes be difficult to start. This is due mainly to the high viscosity of the oil present in the lubrication systems of the engines and, to a lesser extent, to the low volatility of their fuel. This is true of both aircraft mounted gas turbine engines and those which are used in ground-based installations.

It is an object of the present invention to provide a gas turbine engine which is easier to start in such cold conditions than is the case with existing engines.

According to the present invention, a gas turbine engine is provided with an electric starter unit, said starter unit being adapted to provide rotation by direct drive of at least one of the rotatable parts of said gas turbine engine to facilitate engine starting, said gas turbine engine having an oil-based lubrication system, means being provided to place the oil in said lubrication system in heat exchange relationship with said electric motor starter unit, at least during engine starting, to provide an increase in temperature, and consequent decrease in viscosity, of said lubrication system oil.

The present invention will now be described, by way of example, with reference to the accompanying drawing which is a diagrammatic, partially sectioned side view of a gas turbine engine in accordance with the present invention.

Referring to the drawing, a ducted fan gas turbine engine generally indicated at 10 comprises an air intake 11, a fan 12 contained within a duct 13, the core 14 of the engine 10, and an exhaust nozzle 15.

The engine 10 functions in the conventional manner whereby air entering the engine 10 through the intake 11 is compressed by the fan 12. The air exhausted from the fan 12 is divided into two flows. The first and major flow passes through the duct 13 around the outside of the core 14 to be exhausted from the downstream end of the duct 13 to provide propulsive thrust. The second flow is directed into the engine core 14. There it is compressed further before being mixed with fuel. The fuel/air mixture is then combusted. The resultant combustion products then expand through the core engines' turbines before being exhausted through the exhaust nozzle 15 to provide additional propulsive thrust. The turbines in the engine core 14 drive the fan 12 as well as the core engine's compressors in the conventional manner by coaxial shafts extending along the longitudinal axis of the engine 10.

The ducted fan gas turbine engine 10 is therefore of conventional construction.

Positioned on the underside of the core 14 of the engine 10 is a combined electrical starter/generator unit 16. The unit 16 is thus capable of functioning both as an electric motor and as an electric generator. However, for the purposes of the present invention it is sufficient only that it functions as an electric starter motor.

The unit 16 is provided with a gearbox 17 having an output/input shaft 18. The shaft 18 extends into the engine core 14 to terminate in a bevel gear 19. The bevel gear 19 meshes with a corresponding bevel gear 20 provided on a shaft 21 which extends along the engine longitudinal axis and interconnects portions of the compressors and turbines of the engine 10.

To start the engine 10, an electric current is applied to the unit 16 to cause it to function as an electric motor. The unit 16 thereby rotates the shaft 18 which in turn causes rotation of the shaft 21 and the compressor and turbine rotary portions attached to it. When the engine 10 has reached the appropriate rotational speed, fuel is directed to the engine's combustion apparatus and combustion is initiated. The engine 10 then proceeds to run and the electric current to the unit 16 is discontinued. At this point the unit 16 proceeds to be driven by the engine shaft 21 via the shaft 18 and thereafter functions as an electric generator.

The casing of the unit 16 is essentially of double walled construction so that a space is defined between those walls. That space is fed with oil from the main oil supply system of the engine 10 via an inlet pipe 22. This is to ensure that the oil is placed in heat exchange relationship with the unit. However it will be appreciated that other means, such as a heat exchanger within the unit 16, could be used to achieve this end. The oil having flowed through the space between the walls is exhausted from the unit through an outlet pipe 23 which returns the oil to the engine main oil supply system via a heat exchanger 24. A by-pass pipe 25 having a valve 26 interconnects the oil inlet and outlet pipes 22 and 23 respectively. Thus operation of the valve 26 regulates the amount of oil which flows through the space between the walls of unit 16 casing. If desired, a further valve (not shown) could be provided in the oil inlet pipe 22 downstream of the interconnecting pipe 25. Closure of the further valve when the valve 26 is open would result in a complete diversion of oil flow away from the unit 16.

When it is desired to start the engine 10 in very cold atmospheric conditions, the unit 16 is operated to rotate the engine shaft 21. This results in the unit 16 rapidly increasing in temperature. The resultant heat generated raises the temperature of the cold, viscous oil from the engine's main oil system which by this time is being pumped through the space defined by the double wall of the unit 16. The oil is pumped by the main oil pump (not shown) of the engine 10 which operates upon rotation of the engine shaft 21.

Operation of the unit 16 is continued until the temperature of the oil in the engine's main oil system has been increased to such a level that the oil is of a suitable viscosity for engine starting. At this point fuel is supplied to the engine's combustion apparatus. Ignition of the fuel passing through the engine's combustion apparatus is then initiated which in turn leads to the normal running of the engine.

As previously stated, the oil from the engine's main oil system passes through a heat exchanger 24. The heat exchanger 24 places the oil in heat exchange relationship with fuel passing through a supply pipe 27. The fuel passing through the pipe 27 is that which is subsequently directed to the engine's combustion apparatus. Consequently as the oil passing through the heat exchanger 24 progressively heats up, so does the fuel passing through the pipe 27. Heating up the fuel in this manner increases its volatility which in turn makes the fuel easier to ignite.

When the start sequence has been completed and the engine 10 is running, the oil control valve 26 is operated to ensure that the oil flow through the unit 16 is reduced to a level at which its temperature does not affect the efficient operation of the unit 16 during its generation of electricity. Indeed as previously stated, the provision of a further valve in the oil inlet pipe 22 could be used to completely cut off the oil flow to the unit 16.

It will be seen therefore that the present invention provides an easy, inexpensive way of starting gas turbine engines in cold conditions.

I claim:

1. A gas turbine engine provided with an electric starter unit, said starter unit being adapted to provide rotation by direct drive of at least one of the rotatable parts of said gas turbine engine to facilitate engine starting, said gas turbine engine having an oil-based lubrication system, means being provided to place the oil in said lubrication system in heat exchange relationship with said electric motor starter unit, at least during engine starting, to provide an increase in temperature, end consequent decrease in viscosity, of said lubrication system oil.

2. A gas turbine engine as claimed in claim 1 wherein said engine includes compressor and turbine sections drivingly interconnected by shaft means, said starter unit being adapted to drive said shaft means during engine starting.

3. A gas turbine engine as claimed in claim 1 wherein said oil-based lubrication system includes a heat exchanger, said heat exchanger being adapted to place oil contained within said lubrication system in heat exchange relationship with fuel operationally passing through the fuel system of said gas turbine engine.

4. A gas turbine engine as claimed in claim 1 wherein means are provided to by-pass at least part of the oil directed to said starter unit for heat exchange therewith during the normal running of said engine.

5. A gas turbine engine as claimed in claim 1 wherein said starter unit is additionally adapted to function as an electric generator during normal engine running.

6. A gas turbine engine as claimed in claim 1 wherein said engine is a ducted fan gas turbine engine.

* * * * *